March 16, 1926. 1,576,960

H. A. FOOTHORAP

ACTUATING MECHANISM

Filed May 2, 1921 11 Sheets-Sheet 4

Inventor,
Harry A. Foothorap.
Attorney

March 16, 1926
BEST AVAILABLE COPY
1,576,960
H. A. FOOTHORAP
ACTUATING MECHANISM
Filed May 2, 1921 11 Sheets-Sheet 5
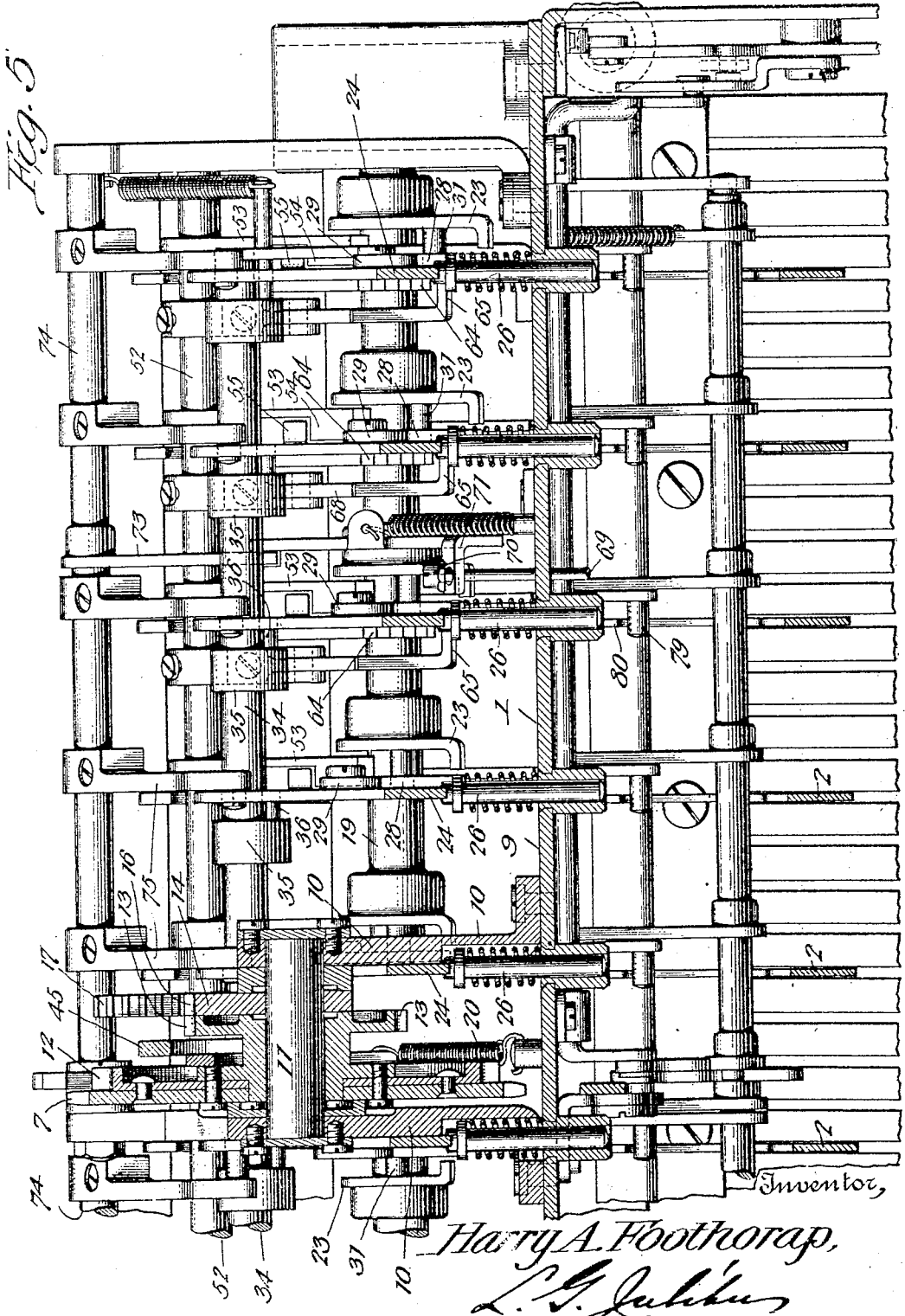
Inventor
Harry A. Foothorap,
Attorney

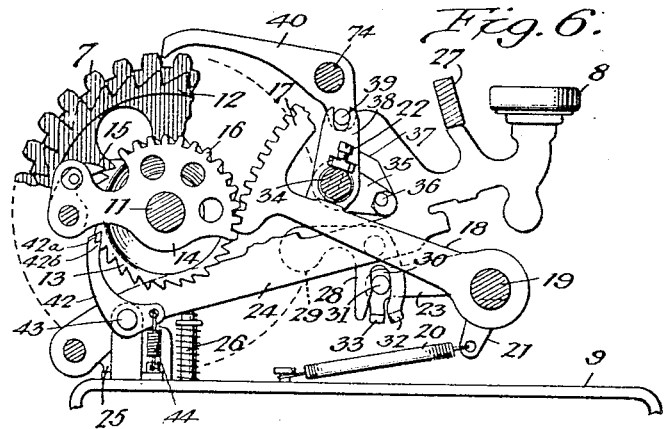
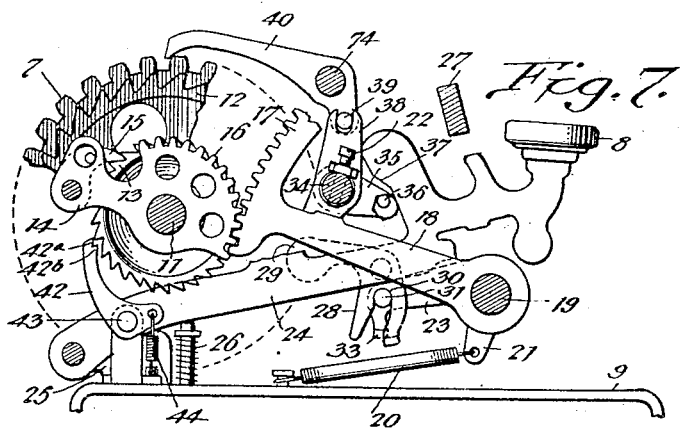
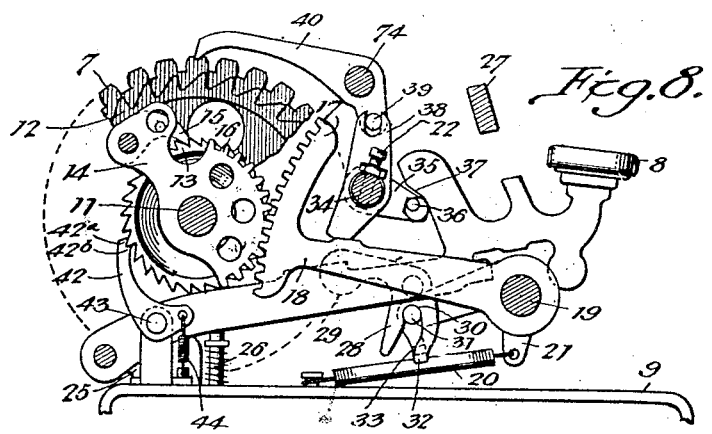

Inventor,
Harry A. Foothorap.

March 16, 1926. 1,576,960

H. A. FOOTHORAP

ACTUATING MECHANISM

Filed May 2, 1921 11 Sheets-Sheet 8

Inventor,
Harry A. Foothorap.
By L. G. Julian
Attorney

March 16, 1926. 1,576,960
H. A. FOOTHORAP
ACTUATING MECHANISM
Filed May 2, 1921 11 Sheets-Sheet 9

Inventor,
Harry A. Foothorap.
By L. G. Julihn
Attorney

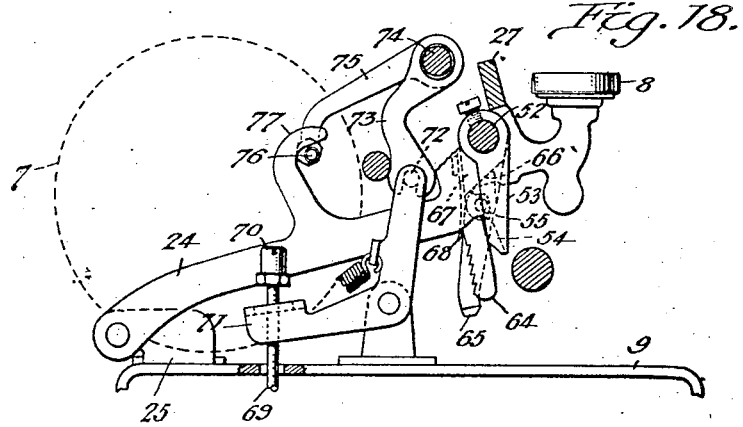
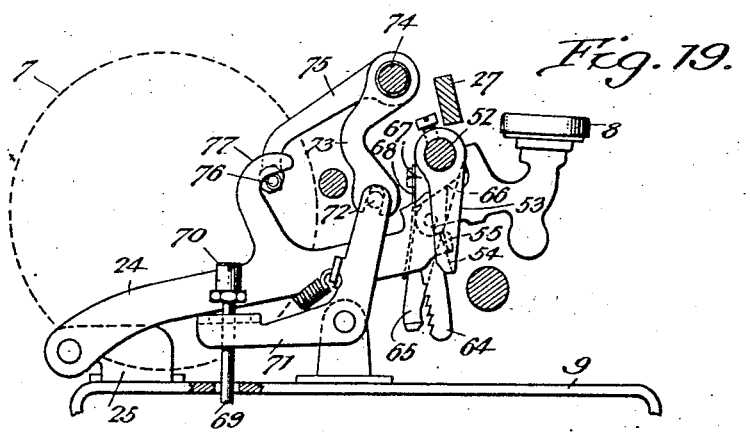
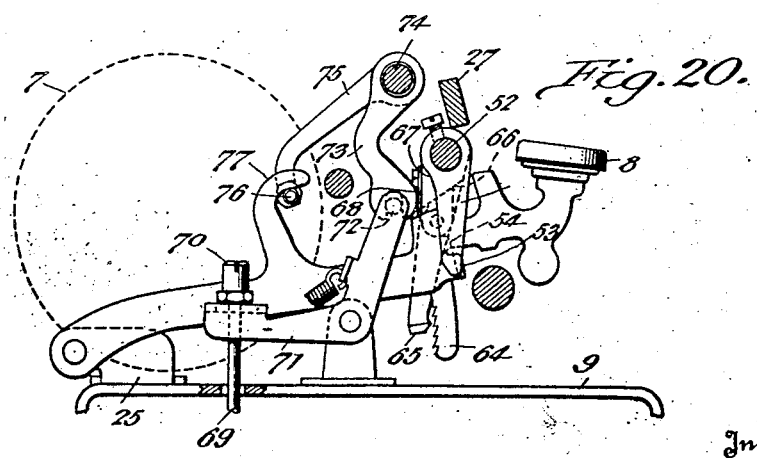

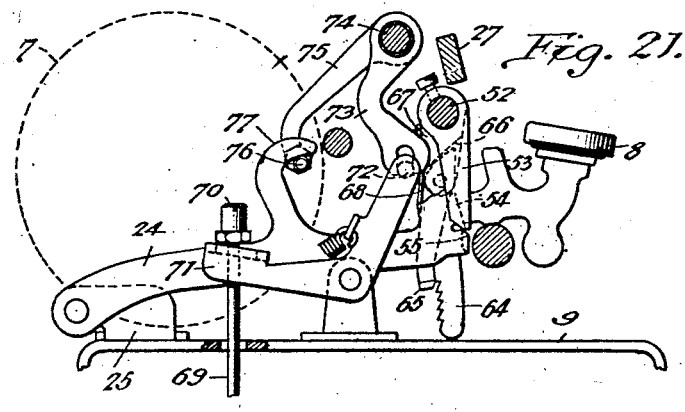
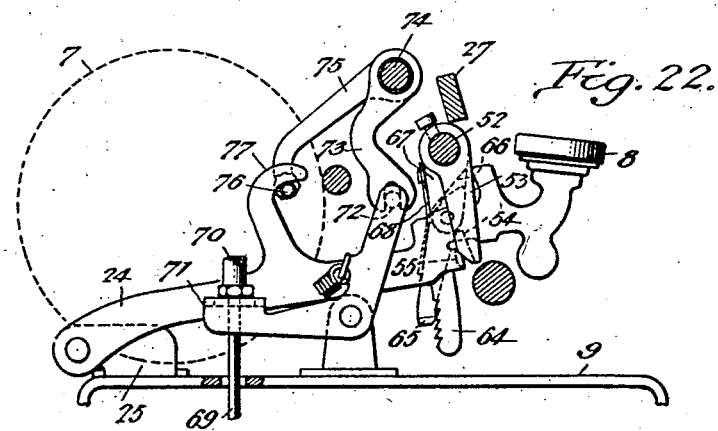
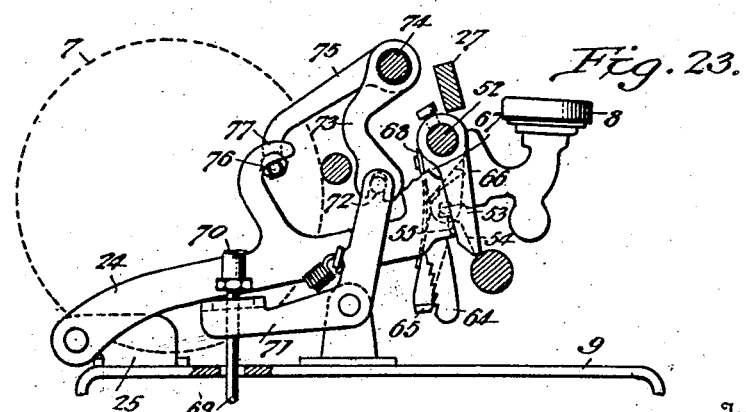

Patented Mar. 16, 1926.

1,576,960

UNITED STATES PATENT OFFICE.

HARRY ARTHUR FOOTHORAP, OF HARRISBURG, PENNSYLVANIA, ASSIGNOR TO ELLIOTT-FISHER COMPANY, A CORPORATION OF DELAWARE.

ACTUATING MECHANISM.

Application filed May 2, 1921. Serial No. 466,340.

*To all whom it may concern:*

Be it known that HARRY A. FOOTHORAP, a citizen of the United States, residing at Harrisburg, in the county of Dauphin and State of Pennsylvania, has invented certain new and useful Improvements in Actuating Mechanism, of which the following is a specification, reference being had therein to the accompanying drawing.

This invention relates to an improved writing adding machine and more particularly to what is known as the actuating mechanism.

The object of the invention is to produce an actuating mechanism of maximum accuracy of operation and of such simplicity of construction as will minimize the cost of manufacture and repair. To the accomplishment of this general object, various objects of subordinate character will clearly appear as the succeeding description is developed.

In the accompanying drawings,

Figure 5 is a longitudinal section viewed from the rear.

Figure 1:
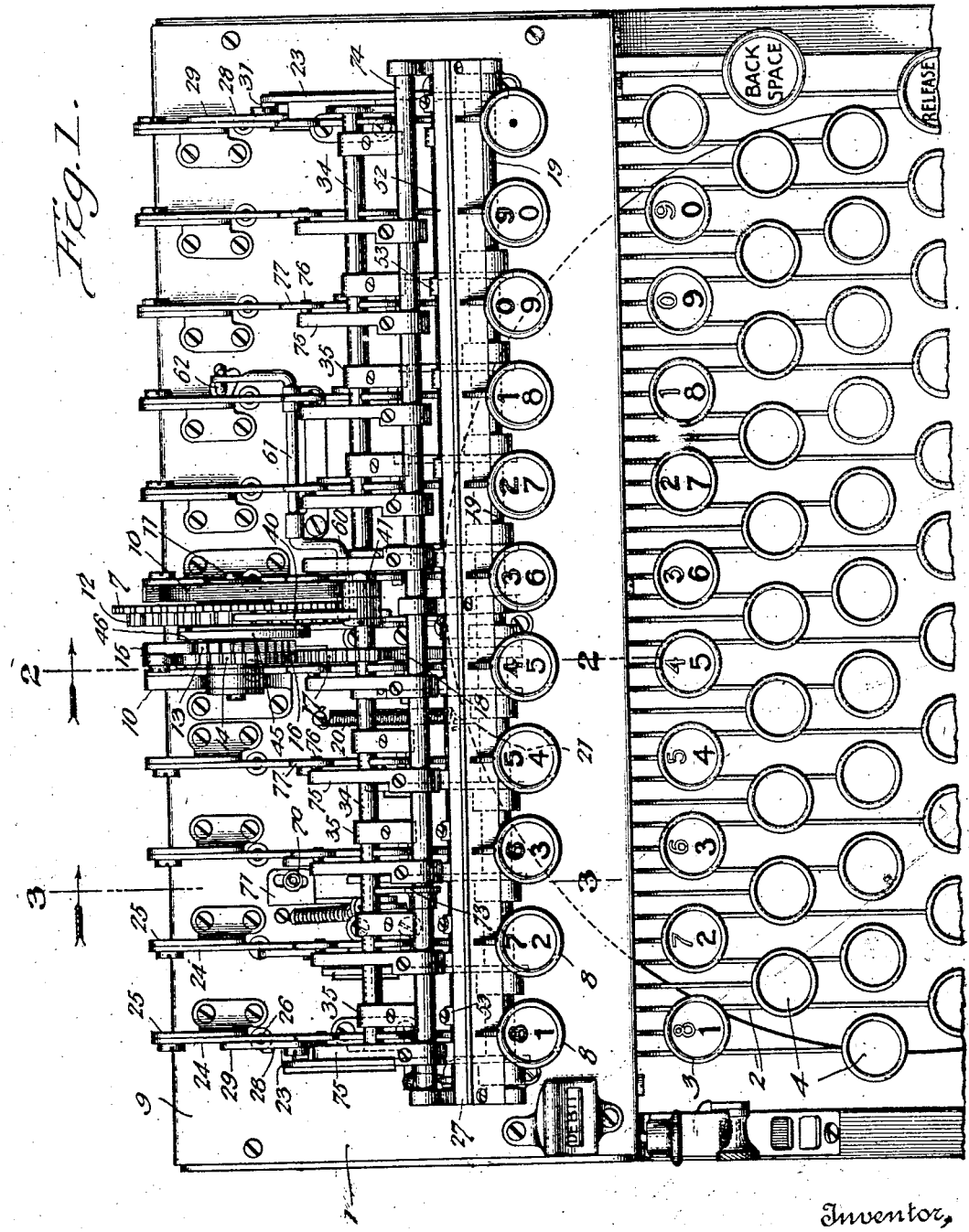
Figure 1 is a plan view of a portion of an Elliott-Fisher machine equipped with my actuating mechanism.
Figure 2:
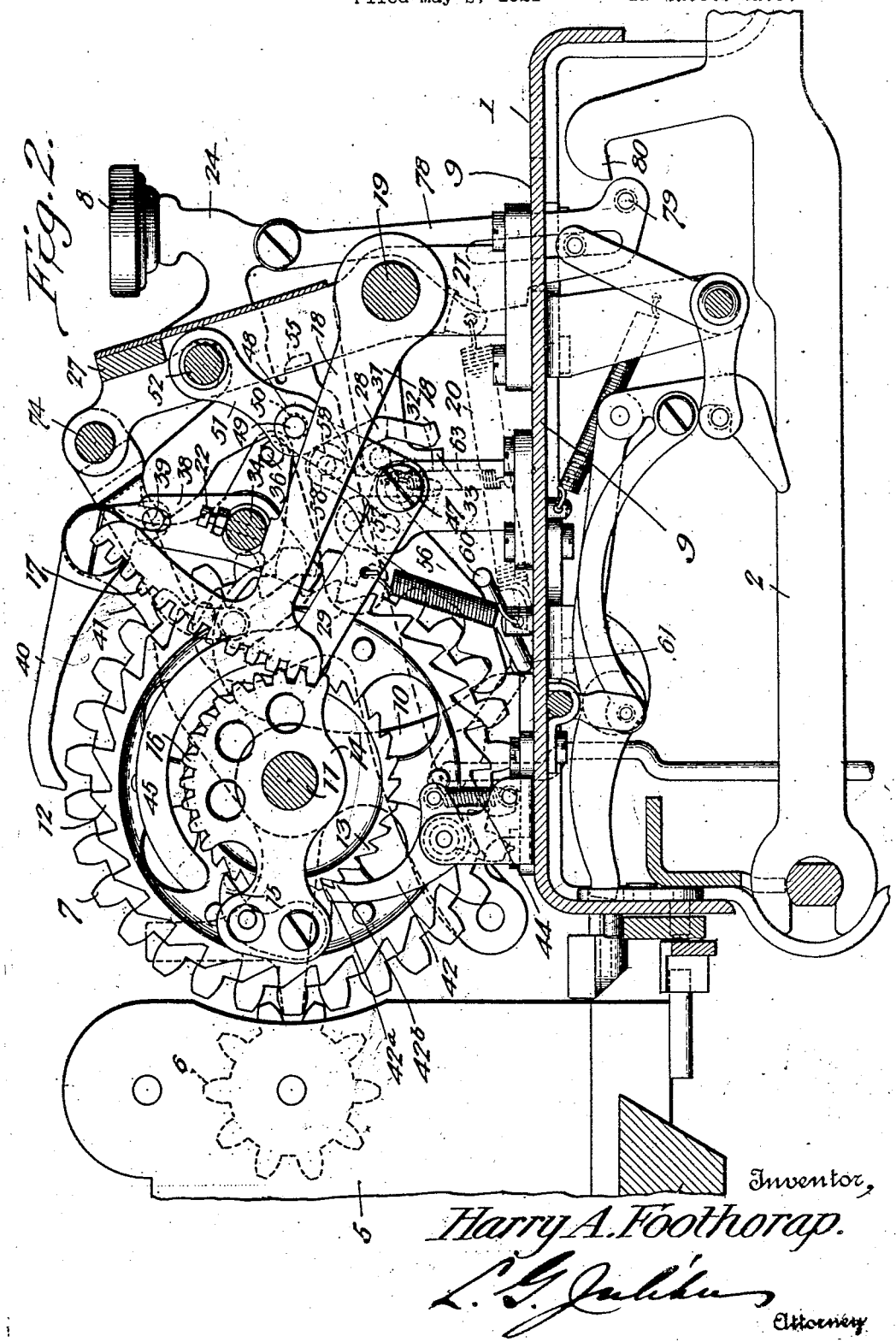
Figure 2 is a section on the line 2—2 of Figure 1 with a more or less diagrammatic illustration of a register included.
Figure 3:
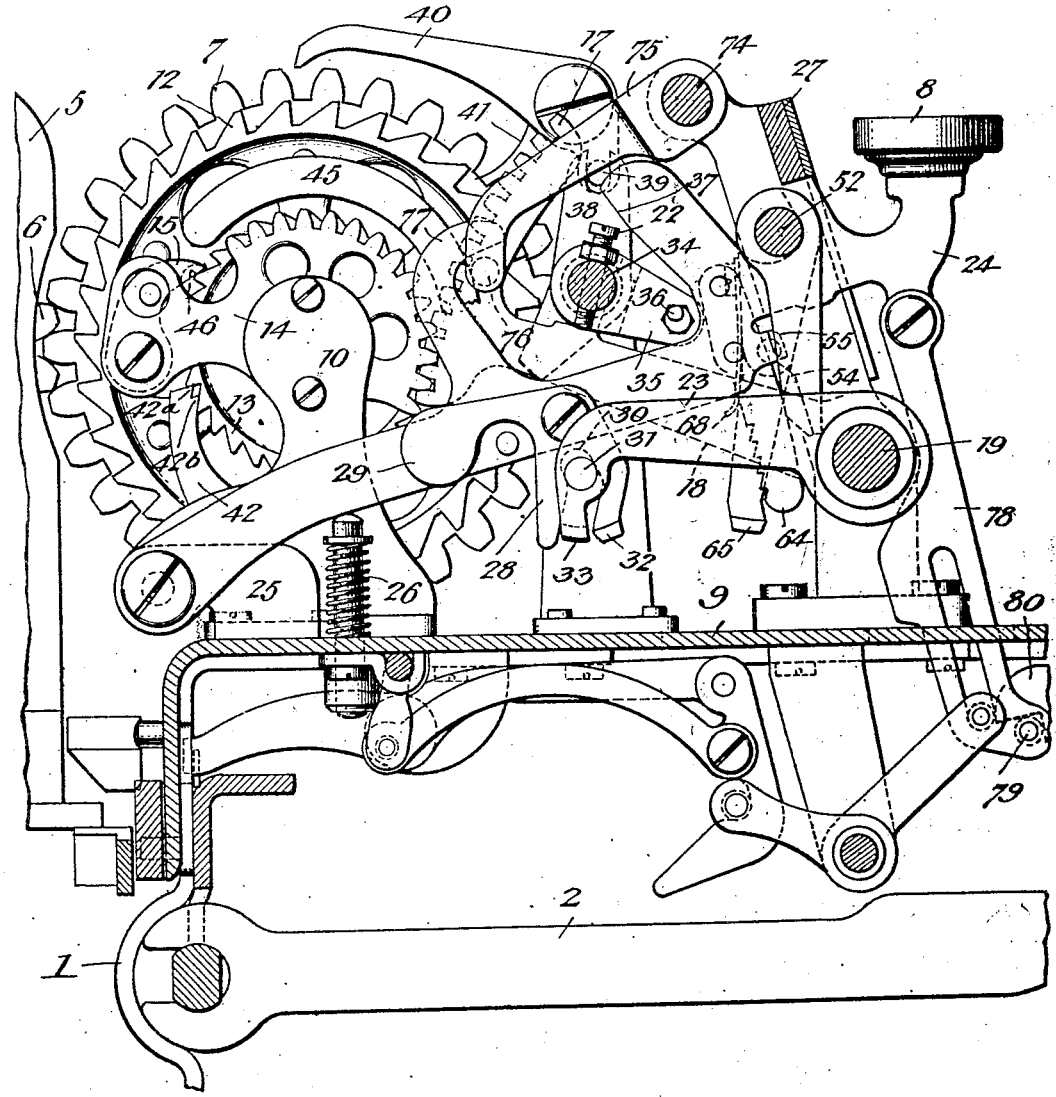
Figure 3 is a similar view on the line 3—3 of Figure 1 with certain of the parts in different positions.
Figure 4:
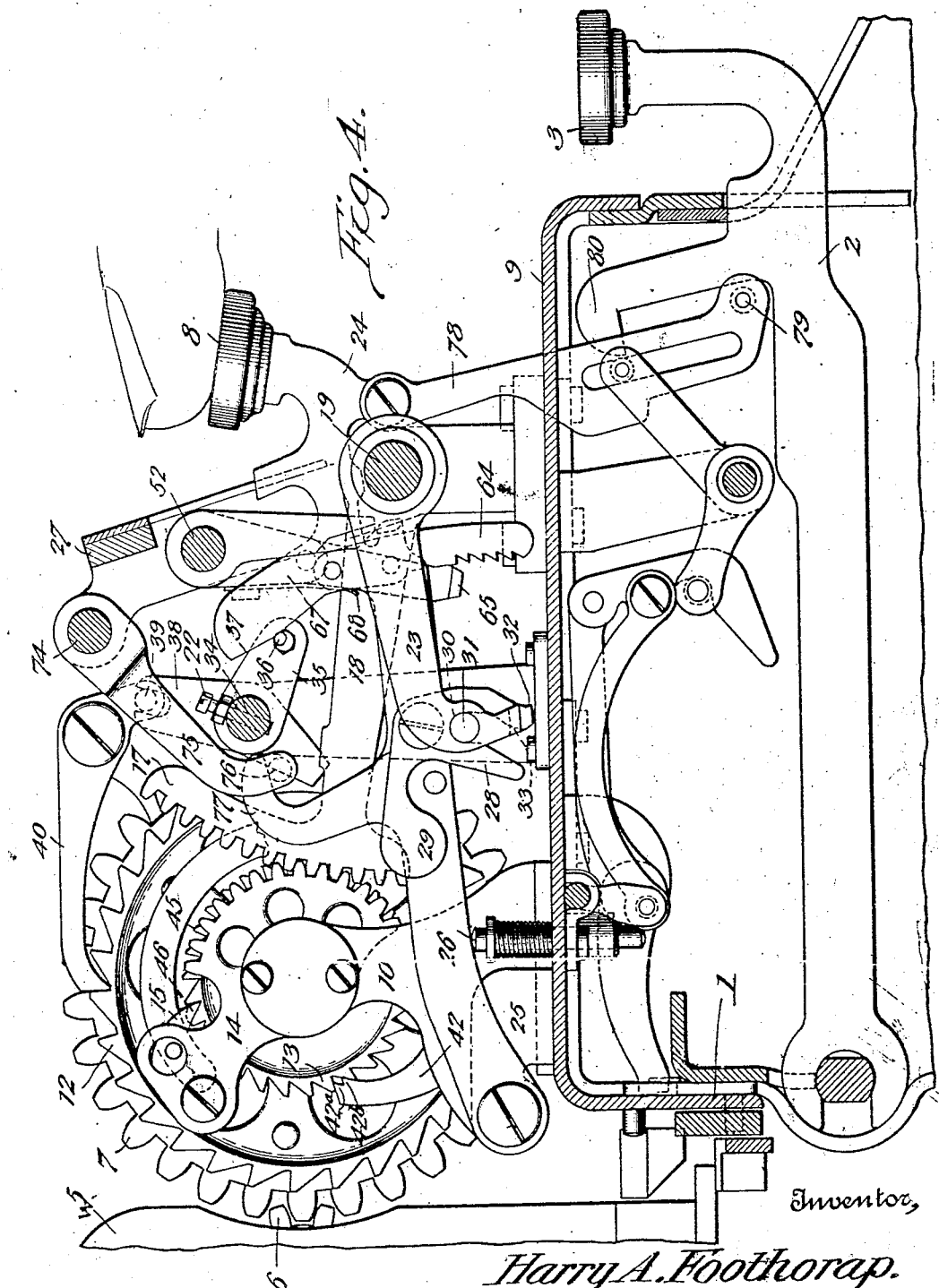
Figure 4 is still another view of this character, showing a non-print key depressed.
Figure 9:
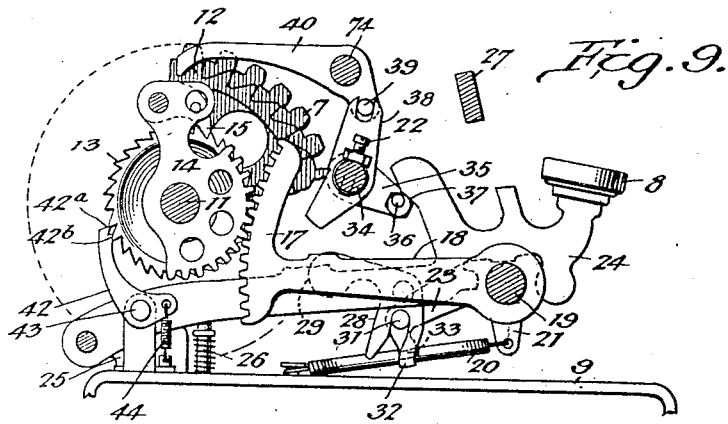
Figure 10:
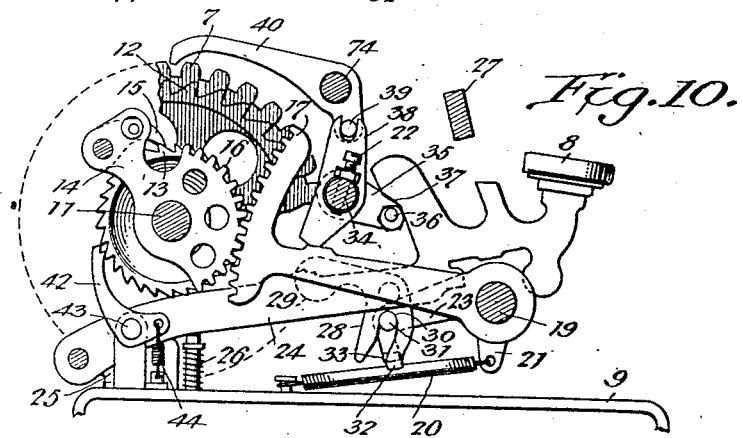
Figure 11:
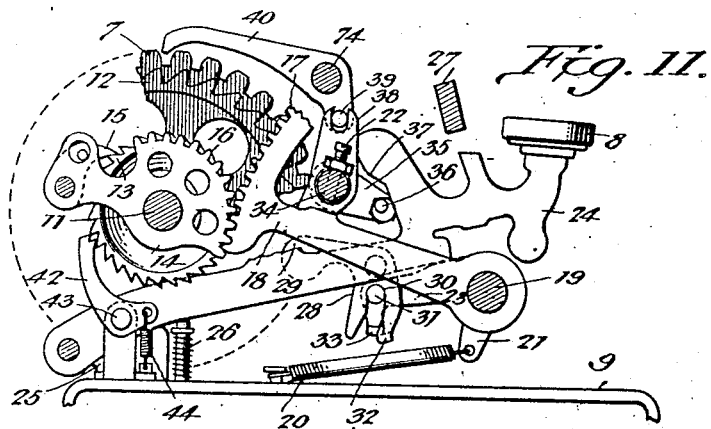

Figures 6 to 11 inclusive are detailed views of the mechanism for transmitting motion from a non-print key to the master wheel, and including the master wheel stop pawl, the master wheel check pawl and the key lever return lock, the key being shown in progressive positions and the various other parts being correspondingly positioned.

Figures 12 to 17 inclusive are detailed views similar in character to Figures 6 to 11, but illustrating more particularly the action of the driving pawl lock arm, the master wheel locating pawl and the carriage lock.

Figures 18 to 23 inclusive are detailed views corresponding with the two groups just described, but showing more particularly the mechanism for controlling the carriage escapement from the non-print keys and the key lever ratchet lock for dogging the key during retraction.

1 indicates the carriage of the Elliott-Fisher writing adding machine of commerce equipped, as is well understood in the art, with the usual writing mechanism and appurtenances necessary to the typewriting of words and numbers as the printing keys are operated to print the characters, one at a time, on a work sheet and to advance the carriage step by step both transversely and longitudinally of the subjacent platen for letter and line spacing. For the purpose of this disclosure it has been deemed sufficient to indicate the key levers 2 and the numeral and letter keys 3 and 4. In rear of the carriage and supported independently thereof are one or more registers or totalizers 5 equipped with a series of denominational members 6 in the form of toothed wheels which are rotated by what is known as actuating mechanism, to totalize, and register the total, of numerical values as the numbers are printed on the sheet. It will be understood, of course, that the members 6 occupy successive denominational positions and are associated with carrying mechanism which transfers value to the next higher denomination when the limit of value of any given denomination has been reached during the adding operation.

The primary element of the actuating mechanism is a master wheel 7 mounted on and movable with the carriage 1 to successive denominational positions and toothed as shown to mesh with successive denominational members 6 of the relatively stationary register 5. The master wheel 7 is rotated in different degree by the respective numeral keys to move the engaged denominational member a number of steps or increments corresponding to the value of the particular key operated. In addition to the numeral keys 3 the operation of which effects both the printing and adding of values, the master wheel is also operated by non-print keys 8 which, as their name indicates, rotate the master wheel and operate the register without printing.

Rising from the cover plate 9 of the carriage 1 adjacent to the rear edge thereof, are brackets 10 which support the stub shaft 11. On this shaft are mounted to rotate in unison a master wheel, 7, a master wheel stop ratchet 12 and a master wheel driving ratchet 13. Also mounted to rotate on the shaft 11, but independent of the master wheel, is a master wheel driving arm 14 having a driving pawl 15 arranged to engage the driving ratchet 13 for the purpose of driving the master wheel 7. The driving arm 14 has a toothed driving segment 16 meshing with an operating sector 17 formed at the rear end of an operating arm 18 fixed to a driving shaft 19 and oscillating therewith. A spring 20 attached to a projection 21 on the shaft 19 holds the segment in its fully retracted position which is determined by the adjustment of a stop screw 22 with which the operating arm 18 contacts. Extended rearwardly from the driving shaft 19 are a series of driving arms 23. These arms are graduated in length and correspond in number with a series of actuator key levers 24 fulcrumed at their rear ends on brackets 25 and provided at their front ends with the non-print keys 8. The levers 24 are urged upwardly by spring pressed plungers 26 and are arrested in their fully elevated or retracted positions by a universal stop 27. The cooperative relation between each actuator key lever 24 and the adjacent driving arm is effected by a pivoted member 28 which, besides constituting a connection between the key lever and the driving arm during depression of the key, also serves as a key lever return lock which insures with certainty against the possible return of the key lever unless and until the associated parts of the actuating mechanism are also properly returned to normal position. The members 28 are located at varying distances from the alined fulcrums of the levers 24 in correspondence with the varying lengths of the driving arms 23 and each is provided with a weighted portion 29 disposed horizontally and with a vertically disposed, but cam shaped slot 30 for the reception of a driving pin 31 extended laterally from the free end of the adjacent driving arm 23. The normal location of the slot and pin 30 and 31 (see Fig. 6) provides for sufficient lost motion of the key lever 24 prior to its engagement with the driving arm to cause slight pivotal movement of the pivoted member 28 on its axis for the purpose of presenting a lug 32 on said member beneath a lug 33 on the driving arm 23. This overlapping of the lugs 32 and 33 continues during the remainder of the key stroke and forms a key lever return lock which prevents the key lever from returning to normal position except as the driving arm and associated parts also return to normal position. When, however, the driving arm has returned to normal position, the independent movement of the key lever at the end of its retracting movement which cor- responds to the lost motion at the beginning of its operating movement will cause the key return lock to be swung by the pin 31 to withdraw the lug 32 from coaction with the lug 33 (see Figs. 6 to 11).

Mounted in suitable bearings and extended across the machine above the operating arm 18 is a rock shaft 34 which carries the stop screw 22 and is provided with a series of forwardly extended arms 35 having eccentrically adjustable pins 36 disposed to be engaged by cams 37 projecting upwardly from the actuator key levers 24, the cams coacting with the pins 36 to rock the shaft 34 and thus swing an arm 38 fixed to the shaft 34 and bifurcated to engage a pin 39 projecting from the short end of a master wheel stop pawl 40 suitably mounted on a bracket extension 41 and arranged to engage the master wheel stop ratchet 12 for the purpose of preventing overthrow of the master wheel. To dog the master wheel in the opposite or rearward direction a check dog 42 is provided. This dog, which is pivotally mounted at 43 is provided with two engaging teeth 42$^A$ and 42$^B$, and is yieldingly urged into engagement with the teeth of the driving ratchet 13 by a spring 44. The engaging stop faces of the teeth 42$^A$ and 42$^B$ are spaced apart about one half the distance between the engaging faces of two adjacent teeth of the ratchet 13. This results in checking the driving ratchet in a manner to prevent more backward movement than is represented by one half of a tooth space.

Figure 12:
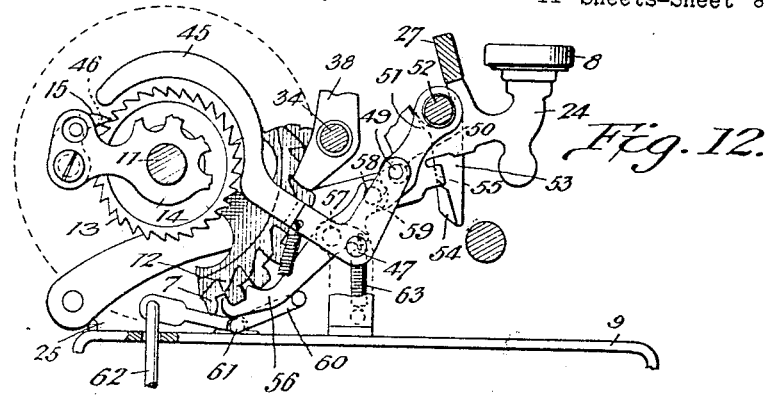
Figure 13:
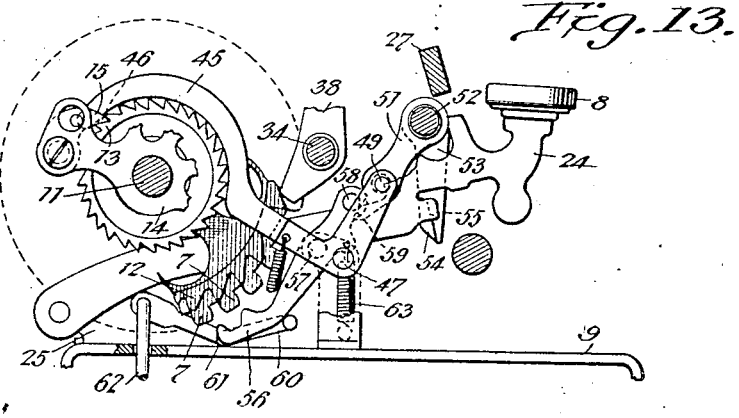
Figure 14:
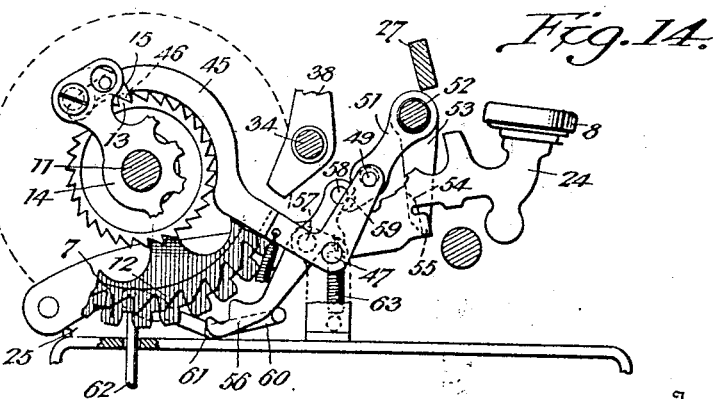
Figure 15:
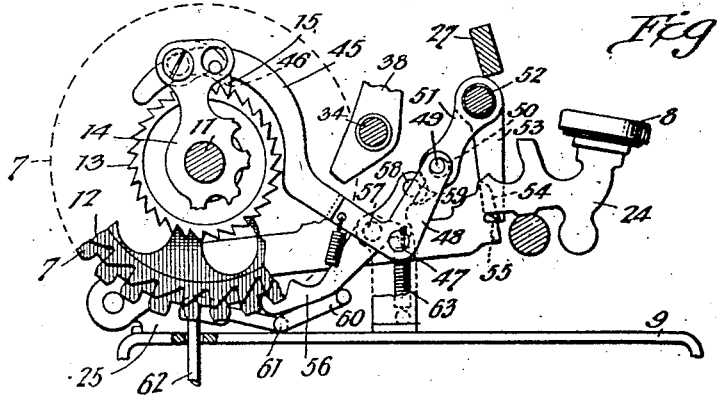
Figure 16:
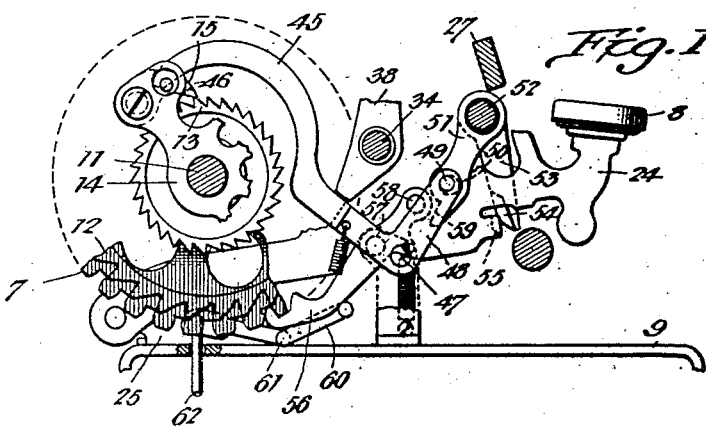
Figure 17:
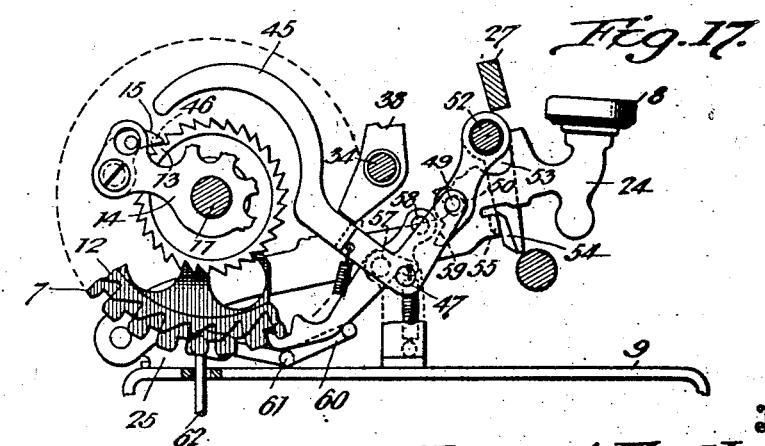

For the purpose of positively holding the driving pawl 15 in engagement with the driving ratchet during the operating movement, a driving pawl lock arm 45 having its rear end concentric with the driving ratchet is disposed to coact with a projection 46 on the pawl 15. The arm 45 is fulcrumed at 47 and has an angular extension 48 provided with a pin 49 extended into an opening 50 in an arm 51 fixed to a transverse shaft 52. The shaft 52 is provided with a series of depending arms 53 each of which is provided at its end with what is known as an operating cam 54 coacting with a cam 55 on the adjacent actuator key lever. The driving pawl lock arm 45 normally occupies an intermediate position, as shown in Figure 12, to prevent its interference with the movement of the driving pawl into engagement with the ratchet, but is movable first, to a position closer to the driving ratchet as shown in Figure 13 to confine the pawl during the operating stroke, and second, to a position considerably removed as shown in Figure 16 to prevent its interference with the driving pawl as the latter rides backward over the teeth of the driving ratchet during the retraction of the parts. Associated with this mechanism is a master wheel locating pawl 56 which normally embraces a tooth of the master wheel as shown in Figure 12 to accurately locate said wheel for the purpose of insuring proper intermeshing of the master wheel with the denominational members of the register as the carriage moves to present the master wheel to successive members. The locating pawl 56 is fulcrumed at 57 and at its short end is provided with a pin 58 engaged by a projection 59 extended from the end of the arm 51. The pawl 56 is disposed to engage one end of a carriage lock lever 60 fulcrumed at 61, and connected at its opposite end to a draw rod 62 extended downwardly into engagement with the carriage lock. Thus, when the master wheel is released by the withdrawal of the locating pawl 56, the lever 60 will be swung to operate the carriage lock for the purpose of holding the carriage rigid during the operation of the master wheel. It will now be observed that the initial movement of a key lever in addition to properly positioning the lever return lock and the driving pawl, as heretofore described, will also bring the cam 55 on the key lever into engagement with the operating cam 54 to swing the arm 53. This will cause the shaft 52 to rock slightly for the purpose of swinging the arm 51 which will in turn swing the pawl 56 out of engagement with the master wheel, operate the carriage lock lever 60 and swing the driving pawl lock 45 into position to lock the driving pawl in the driving ratchet during the succeeding portion of the key stroke.

The sequence of operation of the parts just described will appear from consideration of Figures 14 to 17, attention being directed to the fact that since the locating pawl 56 is constantly urged toward its engaging position by a spring 63 it will instantly return to its active or engaging position as soon as the cam 55 has passed out of engagement with the operating cam 54 which, however, is positively operated by the cam 55 as the key lever rises, to positively swing the locking arm 45 to a position shown in Figure 16, in which it will offer no resistance to the retraction of the driving pawl.

Referring now more particularly to Figures 18 to 23, it is desirable to dog certain or all of the key levers during the retraction thereof to prevent their downward or operative movement until the retraction has been completed. To do this, the lever is provided with a ratchet 64 depending below the same to be engaged by a key lever ratchet lock 65 in the form of a pawl having a rule joint connection 66 with an arm 67 secured to the shaft 52. The lock 65 is pressed forward by a spring 68 into alinement with the arm 67, but is permitted to yield backward against the resistance of said spring. Normally, the ratchet 64 is located somewhat above the engaging tooth of the lock 65 as it moves down during the initial depression of the key. It will not engage the lock for the reason that the latter is swung back by oscillation of the shaft 52 as the latter is rocked by the coaction of the operating cam 54 and the cam 55 on the key lever. When, however, the key lever is completely operated and the cams disengaged, the rocking of the shaft 52 back to normal position, in the manner heretofore described, will swing the lock against the upper portion of the ratchet and in position to engage successive teeth of the ratchet as the lever rises. As the lock is held in engagement by the spring 68 it will coact with the ratchet to resist an effort to depress the key until the latter has been completely retracted and the cams brought into their proper normal relation.

In this group of figures of the drawings is also shown the action of the mechanism by means of which the carriage escapement is operated by the operation of the non-print keys. An escapement connecting wire 69 is extended upwardly above the cover plate and has an adjustable head 70 normally located above the adjacent end of a bell crank lever 71 slotted to receive the wire. The other end of the lever 71 has a pin 72 engaged by the bifurcated end of an arm 73 extended from a rock shaft 74. The shaft 74 is also provided with a series of arms 75, each equipped with an adjustable pin 76 engaged by one of a series of hooks 77 formed on the key levers 24. When a key is depressed the hook 77 will swing the arm 75 to rock the shaft 74 causing the arm 73 to swing the bell crank 71. At the proper point in the key stroke the head 70 of the wire 69 will be engaged by the bell crank and raised to shift the escapement dogs in a manner well understood in the art. When the key is allowed to rise, the bell crank is shifted in the opposite direction to permit the escapement to let off and the carriage to move to the next denominational position.

Connection between the levers 24 of the actuator and the numeral key levers 2 of the printing mechanism is effected by means of links 78 provided at their ends with pins 79 underlying hooks 80 on the levers 2. This form of connection permits the operation of the actuating mechanism by either the non-print keys independently, or by the numeral keys 3 acting through the links 78 to operate the actuating mechanism as the numerals are printed. The links 78 are swung into and out of cooperative relation with the hooks 80 by key connecting mechanism which, for the purpose of the present disclosure, need not be described. This mechanism, however, is shown and is intended to control the connection between the numeral keys and the actuating mechanism.

It is thought that from the foregoing the construction and operation of the illustrated actuating mechanism will be clearly understood, but I reserve the right to effect modifications and variations of the illustrated structure as may come fairly within the scope of the protection prayed.

What I claim is:

1. In an actuating mechanism, the combination with a master wheel, of a series of actuator levers having aligned fulcrums, and aligned series of driving arms, a single operating connection between the series of driving arms and the master wheel, and a connection between the actuator levers and the driving arms, said connection permitting the operation of the driving arms by any lever, and the movement of the driving arms independently of the other levers.

2. In an actuating mechanism, the combination with a master wheel, a driving shaft, a graduated series of driving arms extended from said shaft, an operating connection between said shaft and the master wheel, a series of actuator levers, and a connection between the actuator levers and driving arms, said connection serving as a lever return lock which will permit any driving arm to move independently of the adjacent lever, but will lock any lever to the driving arm operated thereby, in a manner to compel their retraction in unison.

3. In an actuating mechanism, the combination with a master wheel, of a driving shaft, an operating connection between the driving shaft and the master wheel, a graduated series of driving arms extended from the driving shaft, a series of actuator levers having alined fulcrums, and a series of pivoted lever return locks mounted on the levers and coacting with the driving arms to transmit motion from the levers to the arms, and to prevent the independent retraction of the levers.

4. In an actuating mechanism, the combination with a master wheel, of a driving shaft, an operating connection between the driving shaft and the master wheel, a series of driving arms extended from the shaft, a series of actuator levers, pivoted return locks carried by the levers and each provided with a cam slot, and a lug and pin extended from each driving arm, said pin extending into said cam slot, and a lug carried by each driving arm and coacting with the lug of the return lock to prevent the return or retraction of any lever independently of the driving arm operated thereby.

5. In an actuating mechanism, the combination with a master wheel, a stop pawl therefor, a series of actuator levers, an operating connection between the actuator levers and the master wheel, said operating connection including a pawl carrying driving arm, a rock shaft extended across the series of levers and operatively connected to the stop pawl, a series of arm extended from the shaft, and a series of cams carried by the levers to engage said arms for the purpose of rocking the shaft to throw the stop pawl into position to arrest the master wheel.

6. In an actuating mechanism, the combination with a master wheel, driving ratchet and driving pawl, of a driving pawl lock arm disconnected from the pawl but movable into and out of position to lock the driving pawl in the ratchet during the operating movement.

7. In an actuating mechanism, the combination with a master wheel, its driving ratchet and driving pawl, of a series of actuator levers, means for causing the movement of said levers to drive the ratchet through the medium of the pawl, a driving pawl lock arm, movable into and out of position to lock the pawl in the ratchet, and means operated by the levers to control the movement of the lock arm.

8. In an actuating mechanism, the combination with a master wheel, a driving ratchet and driving pawl, of a series of actuator levers, a driving pawl lock arm movable to lock the pawl in the ratchet during its operating movement, and to release the pawl for retraction, and means for operating the lock arm, said means including coacting cams, one of which is carried by an actuator lever.

9. In an actuating mechanism, the combination with a master wheel, its driving ratchet and driving pawl, of a driving pawl lock arm movable into and out of position to lock the pawl in the ratchet, a series of actuator levers, a rock shaft connected to the lock arm to move the same, a series of arms extended from the rock shaft and each provided with an operating cam, and a cam carried by each of the actuator levers, and coacting with the operating cams to control the movement of the lock arm.

10. In an actuating mechanism, the combination with a master wheel, of driving and locating pawls therefor, a series of actuator levers arranged to rotate the master wheel, through the medium of the driving pawl, and a cam mechanism operated by the levers to control the locating pawl.

11. In an actuating mechanism, the combination with a master wheel, its driving ratchet and driving pawl, of a driving pawl lock arm movable into and out of position to lock the pawl but disconnected from said pawl, a master wheel locater movable into and out of position to locate the master wheel, a series of actuator levers to rotate the master wheel through the medium of the driving pawl, and a cam mechanism operated by said levers to control the lock arm and locater.

12. In an actuating mechanism, the combination with a master wheel, a locater arranged to engage the master wheel, carriage locking mechanism cooperating with the locater, whereby the locater and carriage lock will act in alternation, a series of actuator levers, and an operating connection whereby said levers will positively operate both the locater and lock.

13. In an actuating mechanism, the combination with a master wheel and a series of actuator levers therefor, of an escapement lever having means for connection with a carriage lock, a universal shaft extended across the levers, and a connection between said shaft and the escapement lever and between said shaft and each of the actuator levers.

14. In an actuating mechanism, the combination with a master wheel, and a series of actuator levers therefor, each provided with a return ratchet, of a return lock coacting with each ratchet, and means including a rock shaft operated by each lever for moving the return locks out of interfering relation with the ratchets during the operating movement of the levers.

15. In an actuating mechanism, the combination with a master wheel, of a plurality of actuator levers having a return ratchet, of a rock shaft, a return lock carried by the rock shaft for each return ratchet, and a series of arms carried by the shaft and operated by the levers to control the locks.

16. In an actuating mechanism, the combination with a master wheel, and operating mechanism including an actuator lever, a ratchet carried by said lever, a lock coacting with the ratchet, a rock shaft controlling the movement of the lock, an arm extended from said shaft, and coacting cams carried by the arm and lever respectively.

17. In an actuating mechanism, the combination with a master wheel, of an aligned series of actuator levers, and aligned series of driving arms of graduated lengths, an operating connection between the driving arms and the master wheel and a connection between each actuator lever and one of the driving arms, said connection normally permitting the operation of the driving arm independently of the lever but serving, when the actuator lever is operated, to establish an interlocked connection between the lever and the arm which will compel their retraction in unison.

18. In an actuating mechanism, the combination with a master wheel, driving ratchet and driving pawl, of means for moving the driving pawl into engagement with the ratchet and for driving the ratchet through the medium of the pawl, and a driving pawl lock arm normally out of cooperative relation with the driving pawl but movable into position to lock the driving pawl in the ratchet during the operating movement of the pawl.

19. In an actuating mechanism, the combination with a master wheel of, a locater movable relative to said wheel, a series of actuator levers, operating connections for moving the locater through actuation of the levers, and carriage lock devices adapted for operation through movement of the locater.

In testimony whereof I hereunto affix my signature.

HARRY ARTHUR FOOTHORAP.